United States Patent [19]
Anderson et al.

[11] Patent Number: 5,950,212
[45] Date of Patent: Sep. 7, 1999

[54] METHOD AND SYSTEM FOR WORKLOAD BASED GROUP COMMITTING FOR IMPROVED PERFORMANCE

[75] Inventors: Richard Anderson; Gopalan Arun, both of Nashua, N.H.; Richard Frank, Groton, Mass.

[73] Assignee: Oracle Corporation, Redwood Shores, Calif.

[21] Appl. No.: 08/833,605

[22] Filed: Apr. 11, 1997

[51] Int. Cl.$^6$ .................................................... G06F 17/30
[52] U.S. Cl. ........................................ 707/205; 707/201
[58] Field of Search .............................. 707/203, 2, 202, 707/201, 205; 393/560

[56] References Cited

U.S. PATENT DOCUMENTS

| | | | |
|---|---|---|---|
| 4,410,917 | 10/1983 | Newdoll et al. | 360/15 |
| 5,687,369 | 11/1997 | Li | 707/203 |
| 5,696,967 | 12/1997 | Hayashi et al. | 707/202 |
| 5,745,753 | 4/1998 | Mosher, Jr. | 707/202 |
| 5,799,173 | 8/1998 | Mosher, Jr. | 707/202 |
| 5,799,322 | 8/1998 | Mosher, Jr. | 707/2 |
| 5,802,599 | 9/1998 | Cabrera et al. | 711/170 |
| 5,848,270 | 12/1998 | DeLuca et al. | 395/675 |

*Primary Examiner*—Wayne Amsbury
*Assistant Examiner*—Cheryl Lewis
*Attorney, Agent, or Firm*—Wagner, Murabito & Hao LLP

[57] ABSTRACT

In a relational database management system (RDBMS), a method of issuing input/output tasks (I/Os) which store record information from a buffer to an after image journal (AIJ) file of a durable disk (the AIJ device) where a group commit size is dynamically adapted to the workload of the AIJ device and to the character and volume of data written to the AIJ file. Record information contains data records (including roll back records) and/or commit records that together form database transactions. A commit record written to the AIJ file indicates that data modifications and/or additions embodied in data records associated with the commit record are durable in the RDBMS in that they are stored in a durable media and are recoverable. Rather than issuing I/Os to the disk based on a fixed timer or a fixed record count, the system writes to the AIJ file based on three workload characteristics: 1) the character of the record information received (data or commit record); 2) the AIJ file throughput, measured based on the buffer contents; and 3) the workload of the I/O device (busy or idle). The present invention avoids making a data dependent server process wait unnecessarily if the AIJ device is not busy, thereby improving response time without overloading the AIJ, and minimizes AIJ I/O in heavy workload situations by making the group commit size as large as possible without idling the AIJ device. The system adapts to a changing workload to provide improved response time and throughput.

19 Claims, 9 Drawing Sheets

METHOD AND SYSTEM FOR WORKLOAD BASED GROUP COMMITTING FOR IMPROVED PERFORMANCE

BACKGROUND OF THE INVENTION (1) Field of the Invention

The present invention relates to the field of computer systems. More specifically, the present invention relates to the field of improving record throughput within a relational database management system (RDBMS).

(2) Prior Art

Computer implemented relational database management systems (e.g., RDBMS) are well known in the art. As an RDBMS is used, transactions are processed that alter and/or add to the existing data maintained by data structures within the RDBMS. For instance, as telephone orders are being processed by a merchant using an RDBMS for inventory management and billing, each order of goods or services can be represented by a discrete transaction. Typically, each transaction within the RDBMS is composed of different information records. Data records are used to represent the data that is being added and/or modified within the RDBMS. A roll back record is a type of record that is used to indicate that previously recorded updates within another transaction have been undone by the transaction associated with the roll back record. Lastly, commit records are used to indicate that a particular transaction has evolved into a state whereby it is durably recorded into the RDBMS. With reference to timing, as a transaction is being processed, its associated data records are produced and transmitted. Following the data records, the associated commit record or roll back record is then transmitted.

In many RDBMS, the above mentioned information records are received from various processes and stored in a computer readable memory buffer. Subsequently, the information records are recorded into an after image journal (AIJ) file residing typically in a non-volatile magnetic or optical recording media ("disk"). The information in the AIJ file is then used to represent that the data structures of the RDBMS have been updated. A transaction is "durably recorded" into the RDBMS when its associated commit record (and data records) are stored into the AIJ file on disk. Before a transaction is "durable," its associated commit record resides in the memory buffer within the RDBMS and before the transaction becomes durable, it is not recoverable should the RDBMS temporarily shut down or temporally malfunction in operation. Storage of the record information takes place using a computer driven input/output (I/O) operation which obtains the information from the memory buffer and records (commits) it persistently into the AIJ file on disk. Therefore, commit processing refers to the task of recording transaction information from the memory buffer to the AIJ file on disk to durably record the transaction.

Because the latency of an synchronous I/O operation to the disk is typically rather long (e.g., 10–30 ms, or more) in relation to most other RDBMS activities, a standard database approach for improving the efficiency of simultaneous transaction commit processing is known as the "group commit" operation. Under this approach, the data records and commit records for multiple transactions committing at approximately the same time are "grouped" together and processed as a batch by a single I/O issuing process (the group commitor process). Performing all of the transaction commits as a batch operation results in a significant reduction of I/O operations to the AIJ file by increasing the number of transactions per I/O.

In the prior art, database products determine which transactions are committing at "approximately" the same time through the use of a fixed interval timer. The group commitor process of the prior art sets the fixed interval timer as a mechanism of waiting for other transactions to commit (e.g., store their commit records in the memory buffer). Then, when the timer expires, all transactions that stored a commit record in the memory buffer at or before the fixed timer's expiration are written to the AIJ file on disk and become durable.

Figure 1A:
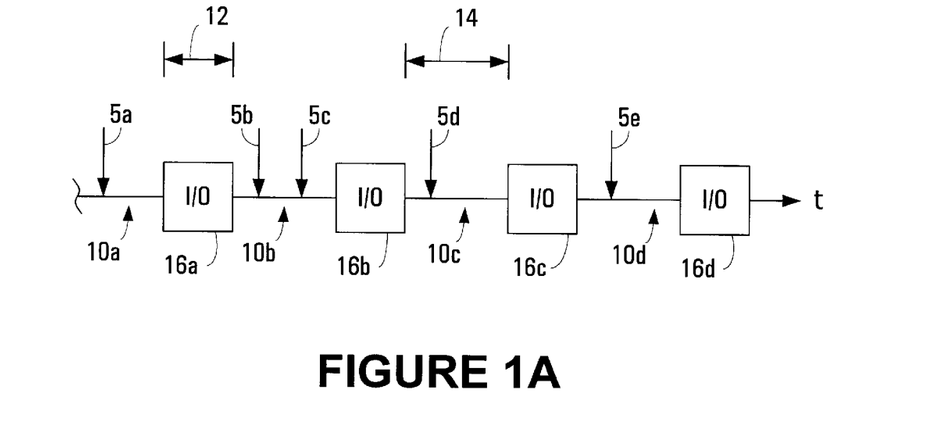
FIG. 1A is a timing diagram of a prior art method of performing group commit using a relatively small size duration group commit interval.

The use of fixed interval timers to perform group commit processing is problematic for various reasons. First, in cases when the workload is heavy (e.g., many commit records are being stored in the memory buffer), there is a risk that the fixed timer interval can be set either too long or too short. For instance, if the timer interval is set too short, as shown in FIG. 1A, then too many I/Os are issued thereby significantly reducing the throughput of the AIJ device, e.g., the disk. To illustrate this case, FIG. 1A shows a timing diagram with four full timer intervals 10a, 10b, 10c, and 10d (where time periods are not shown to scale). Commit records being stored in the memory buffer are shown as down arrows 5a, 5b, 5c, 5d, and 5e. Also shown are four I/O intervals 16a, 16b, 16c and 16d wherein an exemplary duration of each I/O interval is 20 milliseconds (ms) in length 12. Since the timer interval 14 is set too short, four I/Os at 20 ms each are required to store 5 commits to the AIJ file. Under this approach, on average 1.25 transactions are performed per 20 ms or roughly 63 per second, which is far too inefficient for practical use. In this configuration of the prior art, the AIJ device becomes a throughput bottleneck for the database system.

Figure 1B:
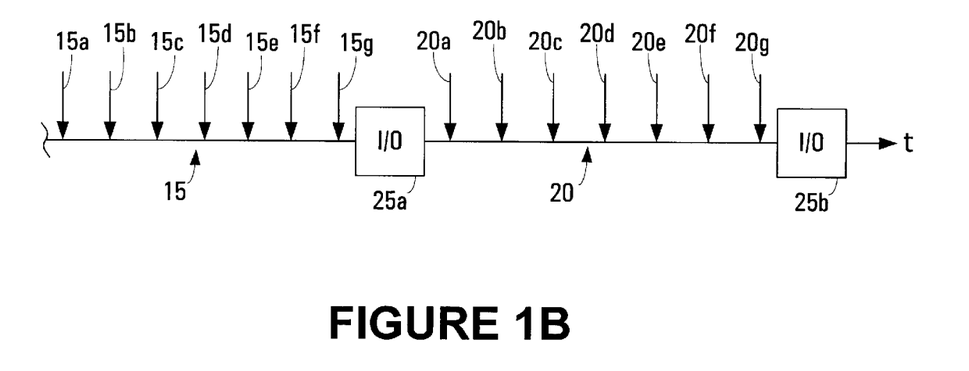
FIG. 1B is a timing diagram of a prior art method of performing group commit using a larger size duration group commit interval in a heavy workload environment.

In cases when the workload is heavy, the timer interval can also be set too long as shown in FIG. 1B (where time periods are not shown to scale). In this instance, commit records received just after an I/O are forced to wait in the memory buffer thereby preventing their associated transactions from completing. Server processes (or threads) that are data dependent on the data associated with these commit records are forced to wait over the interval period until the next I/O. While these processes wait, they consume system resources and, more importantly, they are prevented from performing database modifications while stalled thereby limiting the throughput capability of the database system. Processes waiting ("stalled") are not processing database modifications. This reduces the overall system's throughput.

Furthermore, a transaction is not able to complete until it is durably written into the AIJ file. Therefore, as record 15a is pending in the memory queue until the next I/O cycle, its associated transaction is delayed from completing; the same is true for record 20a and its associated transaction.

In particular, FIG. 1B illustrates two timer intervals 15 and 20 which define the size of their respective commit groups. Each interval commits seven transactions (15a–15g of interval 15 and 20a–20g of interval 20), so the overall data throughput is 350 transactions per second, assuming a 20 ms I/O interval 25a, 25b. Although the data throughput is greater compared to the case above (FIG. 1A), data dependent processes that are dependent on the data associated with commit record 15a are forced to wait almost the entire timer interval 15 before this transaction is actually written to the AIJ file by I/O operation 25a. The same is true with respect to commit record 20a and timer interval 20. While the data dependent processes are delayed, they consume valuable computer resources and reduce data throughput. Furthermore, as stated above, transactions associated with the records in the memory queue are not completed until their records are durably written into the AIJ file. This further reduces throughput.

Figure 1C:
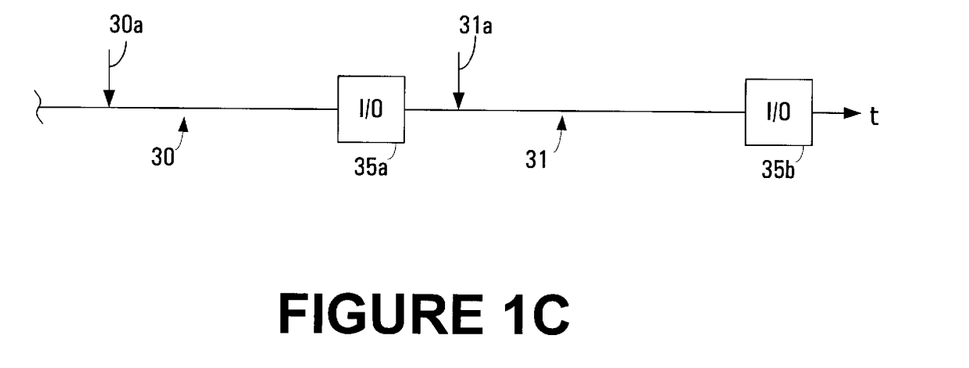
FIG. 1C is a timing diagram of a prior art method of performing group commit using a larger size duration group commit interval in a light workload environment.

Second, in cases when the workload is light, it is appreciated that the use of a fixed timer mechanism to control group commit size results in transactions forced to wait for the timer to expire, even though no other transactions are available to join its commit group. This case is shown in FIG. 1C having one commit record 30a received in timer interval 30 and another commit record 31a received in timer interval 31. Although no other commit records are being received, commit record 30a is forced to wait almost the entire duration of timer interval 30 before being written into the AIJ file by I/O process 35a. The same is true for commit record 31a with respect to timer interval 31. In this latter case, not only are certain data dependent processes (that need the data from the transaction associated with commit record 30a) forced to wait until the timer expires, but the overall AIJ throughput is also decreased using this prior art approach because two I/O operations 35a and 35b are used when one I/O operation would have been sufficient. In short, the prior art use of fixed duration timers is too inflexible for a dynamically changing transaction workload in view of the above instances.

Accordingly, what is needed is a computer implemented system for issuing I/O processes to write transaction records to an AIJ file stored in durable recorded medium that operates efficiently in heavy workload conditions as well as light workload conditions to avoid the problems discussed above. The present invention provides such an advantageous system.

SUMMARY OF THE INVENTION

In a relational database management system (RDBMS), a method of issuing input/output operations (I/Os) which store record information from a memory buffer to an after image journal (AIJ) file of a durable disk unit (the AIJ device) where a group commit size is dynamically adapted to: (1) the workload of the AIJ device; and (2) the character and volume of data written to the AIJ file. The record information contains data records (which can include roll back records) and/or commit records that together form database transactions. A commit record written to the AIJ file indicates that data modifications and/or additions embodied in data records associated with the commit record are durable in the RDBMS, in other words, they are stored in a durable media, e.g., in disk drive, and are recoverable. Rather than issuing I/Os to the disk based on a fixed interval timer or a fixed record count, the present invention writes to the AIJ file based on three workload characteristics: 1) the character of the record information received (data or commit record); 2) the throughput to the AIJ file, which is measured based on the contents of the memory buffer; and 3) the workload of the I/O device (busy or idle). Using the approach, the present invention avoids making a data dependent server process (or thread) wait unnecessarily if the AIJ device is not busy, thereby improving response time without overloading the AIJ, and minimizes AIJ I/O operations in heavy workload situations by making the group commit size as large as possible without idling the AIJ device. The present invention adapts to a changing workload and provides improved response time and throughput by making optimal use of the AIJ device bandwidth.

More specifically, embodiments of the present invention include a method of storing information to a disk drive in a database system having a processor coupled to a bus, a memory coupled to the bus, and the disk drive coupled to the bus, the method comprising the computer implemented steps of: (a) receiving a received information record, the received information record being a data or a commit record and storing the received information record in the memory along with other previously stored information records; (b) determining if a current workload of the disk drive is busy or idle; and (c) based on the character and volume of the information records stored in the memory and based on the current workload of the disk drive, writing information records stored within the memory to an after image journal file of the nonvolatile storage device in an input/output operation wherein the information records stored within the input/output operation represent a group commit size that is dynamic in size, step (c) comprising the steps of: c1) determining if contents of the memory exceed a predetermined maximum size threshold and, if so, writing the contents of the memory to the after image journal file by issuing an input/output operation to the disk drive; c2) provided the disk drive is idle and provided further the received information record is a commit record, writing the contents of the memory to the after image journal file by issuing an input/output operation to the disk drive; and c3) provided the disk drive is idle and provided further the received information record is a data record, accumulating the data record in the memory.

Embodiments of the present invention include the above and wherein step c2) comprises the steps of: writing the contents of the memory to the after image journal file provided the contents of the memory exceed a predetermined minimum size threshold; and writing the contents of the memory to the after image journal file provided the contents of the memory do not exceed a predetermined minimum size threshold but a watch dog timer has expired.

DETAILED DESCRIPTION OF THE INVENTION

In the following detailed description of the present invention, a computer controlled system and method for performing workload-based group committing of transaction records into an AIJ file (after image journal, also called write ahead journal or write ahead log) of a durable recorded media, numerous specific details are set forth in order to provide a thorough understanding of the present invention. However, it will be obvious to one skilled in the art that the present invention may be practiced without these specific details. In other instances well known methods, procedures, components, and circuits have not been described in detail as not to unnecessarily obscure aspects of the present invention.

NOTATION AND NOMENCLATURE

Some portions of the detailed descriptions which follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. A procedure, logic block, process, step, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or "displaying" or the like, refer to the action and processes of a computer system (e.g., 112 of FIG. 2), or similar electronic computing device, that manipulates and transforms data represented as physical (electronic) quantities within the computer system's registers and memories into other data similarly represented as physical quantities within the computer system memories or registers or other such information storage, transmission or display devices.

COMPUTER SYSTEM ENVIRONMENT

Figure 2:
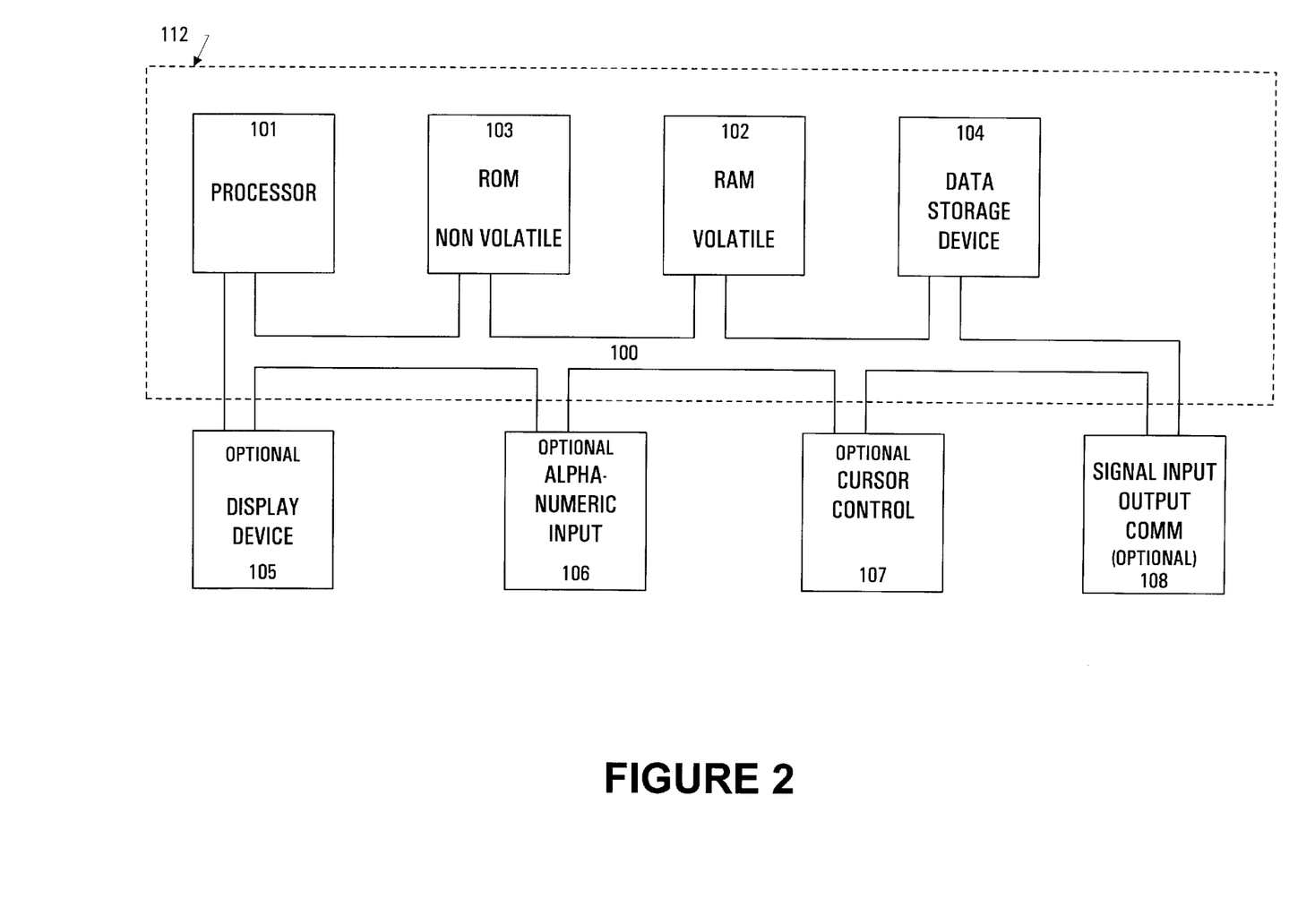
FIG. 2 illustrates a general purpose computer system utilized within the present invention system for identifying equivalent statements within a statement cache.

Refer to FIG. 2 which illustrates a computer system 112. Within the following discussions of the present invention, certain processes (e.g., process 205) and steps are discussed that are realized, in one embodiment, as a series of instructions (e.g., software program) that reside within computer readable memory units of system 112 and executed by processors of system 112. When executed, the instructions cause the computer system 112 to perform specific actions and exhibit specific behavior which is described in detail to follow.

In general, computer system 112 used by the present invention comprises an address/data bus 100 for communicating information, one or more central processors 101 coupled with the bus 100 for processing information and instructions, a computer readable volatile memory unit 102 (e.g., random access memory, static RAM, dynamic, RAM, etc.) coupled with the bus 100 for storing information and instructions for the central processor(s) 101, a computer readable non-volatile memory unit (e.g., read only memory, programmable ROM, flash memory, EPROM, EEPROM, etc.) coupled with the bus 100 for storing static information and instructions for the processor(s) 101. System 112 also includes a mass storage computer readable data storage device 104 (hard drive or floppy) such as a magnetic or optical disk and disk drive coupled with the bus 100 for storing information and instructions. Optionally, system 112 can include a display device 105 coupled to the bus 100 for displaying information to the computer user, an alphanumeric input device 106 including alphanumeric and function keys coupled to the bus 100 for communicating information and command selections to the central processor(s) 101, a cursor control device 107 coupled to the bus for communicating user input information and command selections to the central processor(s) 101, and a signal generating device 108 coupled to the bus 100 for communicating command selections to the processor(s) 101. In one embodiment, system 112 is a DEC Alpha computer system by Digital Equipment Corporation.

WORKLOAD-BASED GROUP COMMIT PROCESS OF THE PRESENT INVENTION

The present invention provides a group commit process that dynamically determines the optimal group commit size based on the AIJ device workload and based on the volume and character of information records received into a memory buffer for storage into the AIJ file. Group commit size, as used herein, refers to the number (or volume) of information records stored in the memory buffer 102a before an AIJ I/O operation is performed which writes the record information to disk 104.

In accordance with one embodiment of the present invention, the size of the next commit group (e.g., the group of transactions with pending commit requests stored in a memory buffer) is continually expanded until asynchronous notification is received that the AIJ device has become free (e.g., it is idle or not busy). At this time, regardless of the size of the next commit group, and regardless of the time that expired since the previous group commit operation, the present invention starts a new group commit operation (I/O). At this time, the AIJ device becomes busy, so another new commit group can be constructed in another portion of the memory buffer (the original memory portion is locked down until the I/O operation completes).

In a light workload situation, the AIJ device may be free (e.g., not busy), when a transaction requests a commit. The present invention then causes an immediate AIJ device I/O with a group commit size of only one transaction. Thus, in a light workload situation, the transaction observes the best possible response time, having to spend no time at all for other transactions to commit.

In heavy workload situations, no transaction is forced by the present invention to wait any longer than necessary in accordance with the present invention. For instance, as soon as the AIJ device is free, the present invention causes a group commit operation to start for all transactions that requested a commit prior to that time (and stored in the memory buffer). Thus, response time is significantly improved. Additionally, with server processes waiting (for AIJ device I/O) for less time than in a fixed timer-based group commit of the prior art, fewer servers can keep the processors 101 occupied doing useful work. Fewer servers means fewer system resources (e.g., main memory 102) are consumed, and better performance (throughput). Overall, the present invention maintains the database system 112 very wellbalanced and finely regulated. The present invention adapts to a dynamically changing workload, and provides improved response time and throughput by making optimal use of the device bandwidth.

Figure 3:
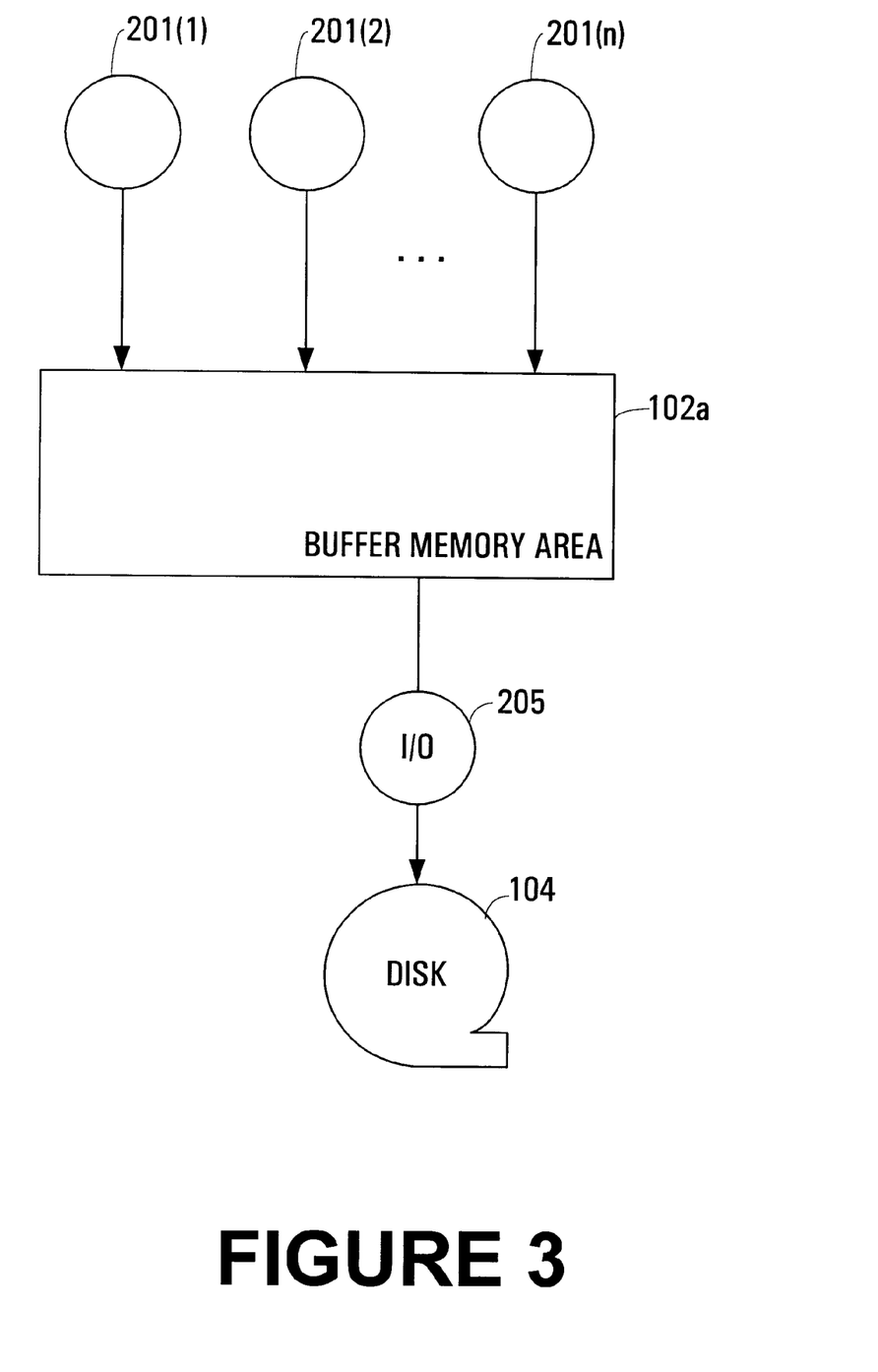
FIG. 3 is a logical diagram of several processes sending record information to a memory buffer interfaced with the I/O issuing procedure of the present invention.

FIG. 3 illustrates a logical block diagram of components of the operating environment of the present invention. Included in this environment are various processes, 201(1) ... 201 (n), that execute within computer system 112. These processes, among other tasks, interface with users and other originators of information that access the database system for inputting, receiving and modifying information stored in the data tables of the database system. The result of the above interface is a sequence of information records that are forwarded from each of the processes 201(1) ... 201(n) to a buffer memory area (or "memory buffer") 102a which is a portion of RAM 102 of FIG. 2 of system 112.

There are two basic types of information records used in accordance with the present invention. The first information record type is a data record (DR) which includes "roll back" records (also called roll back records, RR) but for different transactions. Data records include the data that is input or modified by the information originator (e.g., the user) that is interfaced with the processes 201(1) ... 201(n). For example, if process 201(1) is involved in taking customer orders over a telephone, a data record might include the items that the customer wishes to buy or the customer's address, if the buyer is a new customer, etc. The exemplary process 201(1) would then produce the data record in response to the user supplied information.

A roll back record indicates a reversal in the modified data that already exists within a produced data record. For instance, assume a customer placed an order, and before the transaction completed, the customer called back and changed some items on the original order or added some new items. In this case, one roll back record can be produced by process 201(1) to reflect the reversal of the data changes. It is appreciated that a transaction either commits or rolls back, but not both. A commit record or a rollback record in the AIJ durably terminates a transaction.

The second type of information record produced by processes 201(1)–201(n) is the commit record. A commit record (CR) is associated with data records and together with its associated data records forms a database transaction. Temporally, the commit record is always produced following its associated data records and it is produced by a process of processes 201(1)–201(n) and then supplied to the buffer memory 102a (FIG. 3). It is appreciated that a commit record stored in the AIJ file of disk drive 104 indicates that its associated database transaction is complete and exists in a durable form within durable recorded media (e.g., an optical or magnetic disk media). In this way, the commit record stored in the AIJ file in disk unit 104 indicates that the associated transaction is "hardened" in that if the database system 112 was temporarily shut down or interrupted by malfunction, the durable transaction could readily be recovered by reading the AIJ file.

With reference to FIG. 3, processes 201(1)–201(n) independently store data records (DRs) and commit records (CRs) into memory buffer 102a. It is appreciated that information records are only temporarily stored in memory buffer 102a. Memory buffer 102a is of a programmable size of n bytes and in one embodiment, memory buffer 102a is capable of storing 128 kilobytes. Process 205 of the present invention accesses buffer memory 102a, and at programmed times under programmed conditions, writes the record contents of buffer memory 102a to the AIJ file of disk 104 (also called the AIJ device). A transaction becomes durable when its data record(s) and associated commit record all become stored in the AIJ file of disk 104.

In one embodiment, an I/O operation typically writes approximately 127 blocks to the AIJ device 104 where a block is 512 bytes. Therefore, memory buffer 102a is capable of holding at least 127 blocks of a commit group. At this size, memory buffer 102a can effectively store hundreds of information records at a time.

During the interval while the commit record of a particular transaction exists in the memory buffer 102a only, its associated transaction is not durable. Server processes that are data dependent on this particular transaction's data must wait (e.g., they are temporarily stalled) until the particular transaction becomes durable (at commit time). Once the transaction has been committed (written to the AIJ file), the data dependent server processes can then utilize the transaction's data and continue useful processing. Therefore, it is appreciated that inefficiencies in delaying transaction committing also delay certain data dependent server processes and unnecessarily tie up computer resources. While processes are stalled they are prevented from processing modifications to the database and thereby reduce system throughput. The present invention, by providing a more efficient mechanism for transaction committing thus frees other computer resources by decreasing data dependent process delays.

Figure 4:
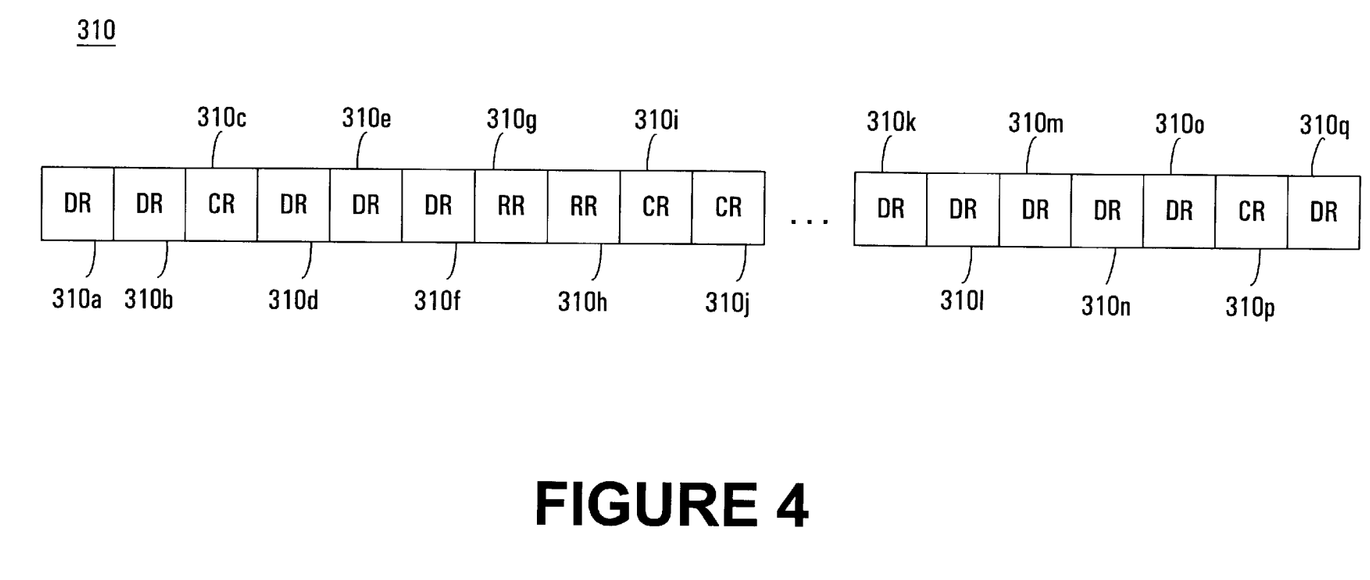
FIG. 4 illustrates an exemplary portion of an after image journal (AIJ) file in accordance with the present invention.

FIG. 4 illustrates an exemplary portion of the AIJ file 310 as stored on disk 104. As shown, AIJ file 310 is composed of various data records (DR) 310a, 310b, 310d–310f, 310k–310(o) and 310q in sequence. Also included in AIJ file 310 are various roll back records (RR) 310g and 310h which are associated with different transactions. Lastly, AIJ file 310 contains several commit records (CRs) 310c, 310i–310j, and 310p. The present invention advantageously recognizes that on average, there are typically many more DRs in combination compared to RRs and CRs. This is the case because many data records can be used by a single transaction while only a single commit record or rollback record is needed for the transaction. An exemplary transaction is represented by data records 310a, 310b and commit record 310i. A second exemplary transaction is represented as data records 310k, 310l, 310m, 310(o) and commit record 310p.

Process 205 (FIG. 3) of the present invention issues I/O operations to the disk drive 104 from buffer memory 102a based on a determination of the current workload of database system 112 and does not issue I/O operations based on a fixed timer interval or a fixed record count as used by the prior art. The workload based group commit determination of the present invention advantageously adapts to its workload environment depending on the current workload of database system 112. This offers optimum record throughput and minimum process delay. The workload based group commit determination of the present invention is itself based on three considerations. First considered is the AIJ throughput which is measured by the contents of the buffer memory 102a and its degree of vacancy. Second considered is the AIJ device workload which is measured based on whether or not the disk drive 104 is busy or idle. Third considered is the character of the information records received and stored in the buffer memory 102a (e.g., whether the record is a data record or a commit record).

Figure 5:
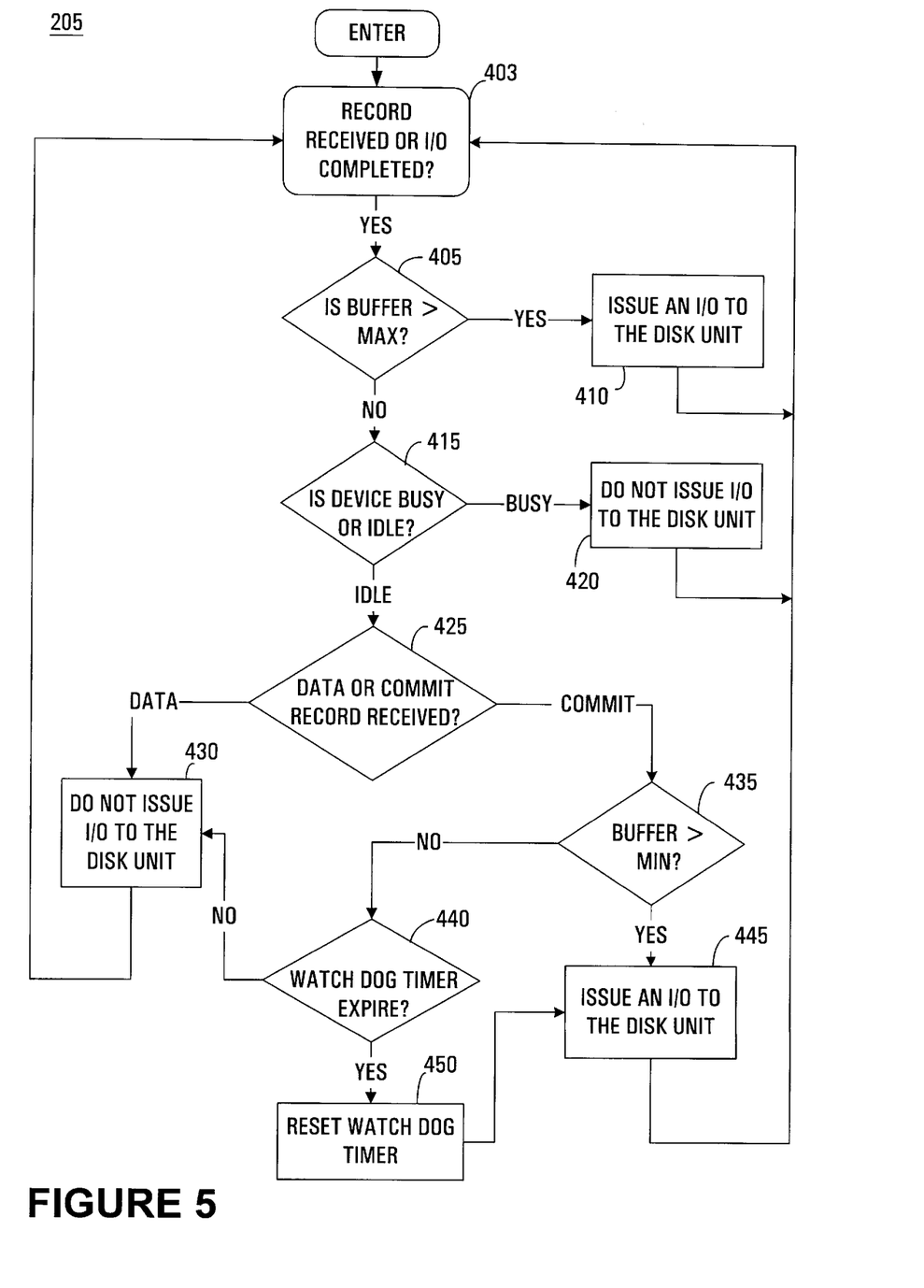
FIG. 5 is a flow diagram of the dynamically adapting I/O issuing procedure in accordance present invention.

FIG. 5 illustrates the steps within process 205 of the present invention and during its discussion, reference is also made to the components of FIG. 3 and AIJ file 310 of FIG. 4. It is appreciated that process 205 (FIG. 5) is implemented as program code stored within computer readable memory units of system 112 and executed by processor 101 using bus 100. As shown by step 403, process 205 is invoked upon each information record (data or commit) being written from a process of processes 201(a)–201(n) into temporary buffer memory 102a and also upon an input/output operation completion. The term "received information record," as used below, refers to the information record that is written from a process of processes 201(a)–201(n) and "received" and stored into temporary buffer memory 102a. It is the received information record that is one element that can trigger step 405 to be entered from step 403; this transition can be handled via an interrupt.

It is appreciated that at step 403 by having a completed I/O operation trigger a transition into step 405, the present invention provides a mechanism for storing records into the AIJ file 310 even if no more AIJ records have been received into the memory buffer 102a. This aspect of the present invention allows an asynchronous I/O operation completion to cause a next I/O to be issued, under the proper conditions outlined in process 205.

At step 405 of process 205, the present invention determines if the memory buffer is filled in excess of some predetermined maximum size (max) that is near the size of the memory buffer 102a (e.g., 90 percent of the total buffer size). If so, then at step 410, the present invention issues an I/O operation to the disk unit 104 to write the record contents of memory buffer 102a to the AIJ file 310. Optionally, at this time, a watch dog timer (step 440) is reset. After the I/O operation is complete, the contents of the buffer memory 102a that were written to the AIJ device 104 are cleared from the buffer memory 102a. This I/O operation is performed regardless of the data character of the received information record. At step 410, the present invention determines a group commit size based on the volume of contents of buffer 102a.

At step 405, if the contents of memory buffer 102a are not in excess of the predetermined max, then step 415 checks if the AIJ device (e.g., disk 104) is busy or idle. At step 415, the present invention accesses the status of the AIJ device 104 to determine its current workload (e.g., busy or idle). If the AIJ device 104 is busy, then at step 420, no I/O operation is issued and processing returns to step 403 to await the next received information record.

At step 415 of FIG. 5, if the AIJ device 104 is idle, then step 425 is entered. At step 425, the present invention examines the character of the received information record to determine if the received record is a data record (including a roll back record) or a commit record. If the received information record is a data record, then step 430 is entered where the present invention does not issue an I/O operation to disk 104 and returns to step 403 to await the next received information record. In this case, the data record is simply accumulated in the memory 102a. It is appreciated that since transactions are completed based on commit records and not data records, the present invention recognizes that server processes are not delayed based on data records that exist within buffer memory 102a but are rather delayed based on commit records that exist within buffer memory 102a. Therefore. since no process is waiting for the received data record, the present invention process 205 does not immediately issue an I/O operation based on the received data record but rather accumulates the data record.

At step 425 of FIG. 5, if the received record is a commit record, then the present invention generally will issue an I/O operation to the disk drive (provided the buffer memory 102a is filled at least to a minimum amount). This aspect, of the present invention recognizes that certain data dependent server processes are delayed and are waiting for the data associated with the received commit record to commit to the AIJ file 310. Therefore, the commit record generally triggers an I/O operation to the AIJ device 104. At step 435, the present invention first checks if the contents of the memory buffer 102a are below a certain predetermined minimum amount (min), e.g., 5–10 percent of the total buffer size. Below this predetermined amount, the present invention does not immediately issue an I/O operation in an effort to increase data throughput per I/O operation. If the contents of memory buffer 102a are in excess of the predetermined minimum, then at step 445 the present invention issues an I/O operation to the AIJ device to write the contents of memory buffer 102a to the AIJ file 310. At this time, the watch dog timer (step 440) is reset and after the I/O operation is complete, the contents of the buffer memory 102a that were written to the AIJ device 104 are cleared from the buffer memory 102a. Processing then returns to step 403. At step 445, the present invention determines a group commit size based on the contents of the memory 102a at the time of the I/O operation.

At step 435 of FIG. 5, if the contents of buffer memory 102a are in fact below the predetermined threshold minimum, then at step 440, a watch dog timer is checked to determine if an excessive amount of time has elapsed since the last I/O operation to the AIJ device 104. Step 440 is performed in an effort to reduce the delay experienced by data dependent processes for the received commit record. If the watch dog timer has not expired at step 440, then step 430 is entered and the received commit record does not cause an I/O access but is accumulated in memory 102a. At step 440, if the watch dog timer has expired, then at step 450, the watch timer is reset and at step 445 the present invention issues an I/O operation to the AIJ device 104 to write the contents of memory buffer 102a to the AIJ file 310. Processing then returns to step 403. At step 445, the present invention determines a group commit size based on the contents of the memory 102a at the time of the I/O operation.

Process 205, by checking the vacancy of memory buffer 102a at step 405, bases one decision to issue an I/O to the AIJ file 104 on the AIJ throughput, e.g., the volume of information records are being stored in the memory file 102a for the AIJ file 310. Process 205, by checking if the AIJ device 104 is busy or idle at step 415, bases another decision to issue an I/O to the AIJ device 104 on the AIJ device's workload. Lastly, process 205, by checking if the received information record is a data record or a commit record, bases another decision to issue an I/O to the AIJ device 104, based on the data character of the received information record. The above three determinations are used by process 205 to provide an optimal group commit size that adapts to the current workload of the AIJ device and the volume and character of data written to the AIJ device.

In accordance with process 205, the present invention provides a group commit procedure that attempts to maximize writing of the AIJ device 104 to increase throughput and minimize delays encountered because data dependent server processes are waiting for an I/O operation to occur for their data dependent transaction to be committed. In general, data records are accumulated and I/O operations are based mainly on received commit records or when the received data records fill the memory buffer 102a.

Figure 6:
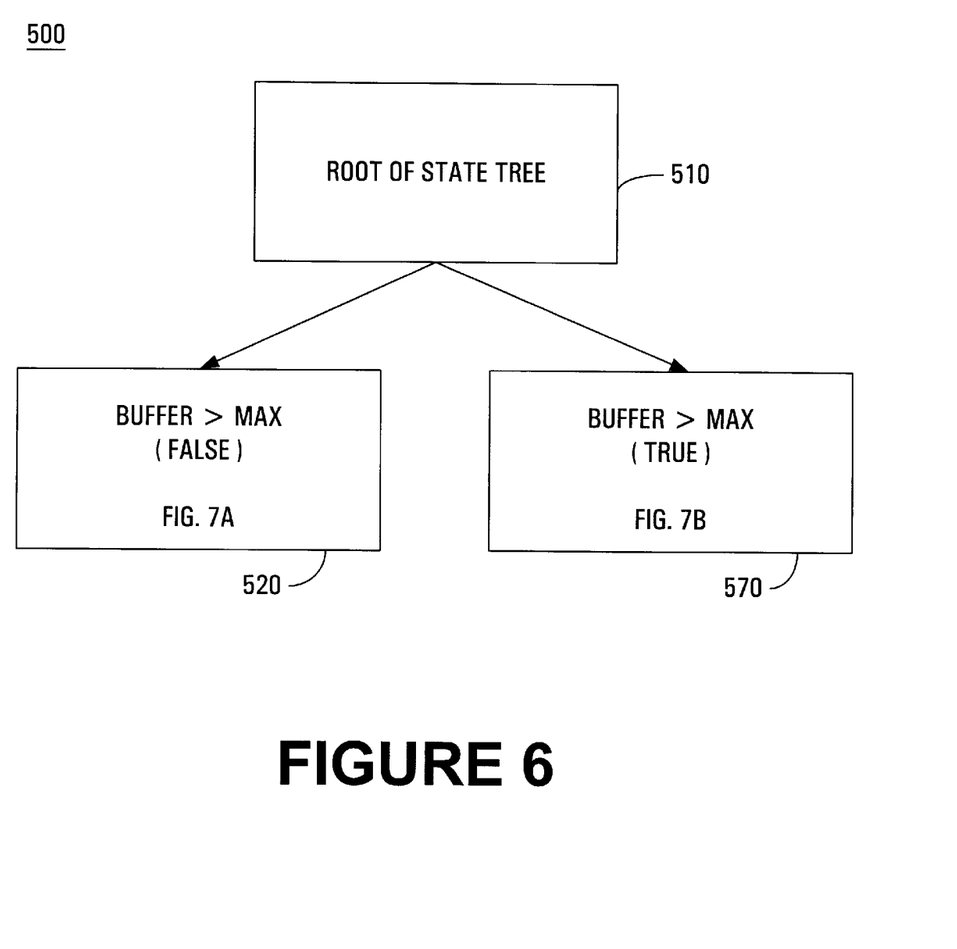
FIG. 6, FIG. 7A and FIG. 7B display a state tree in accordance with the present invention that illustrates conditions when I/Os are issued and conditions when I/Os are not issued based on the dynamically adapting I/O issuing procedure of FIG. 5.
Figure 7A:
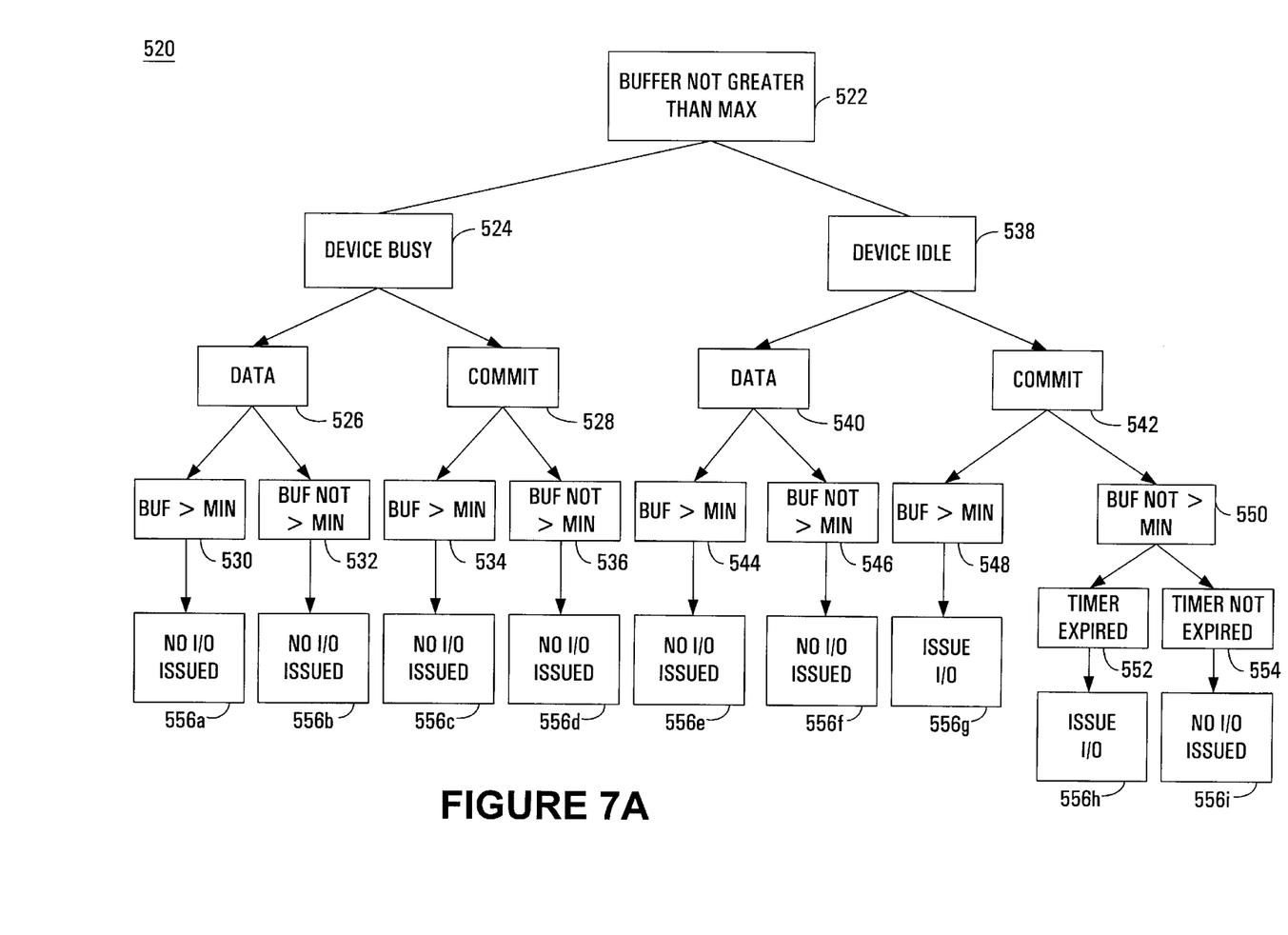
Figure 7B:
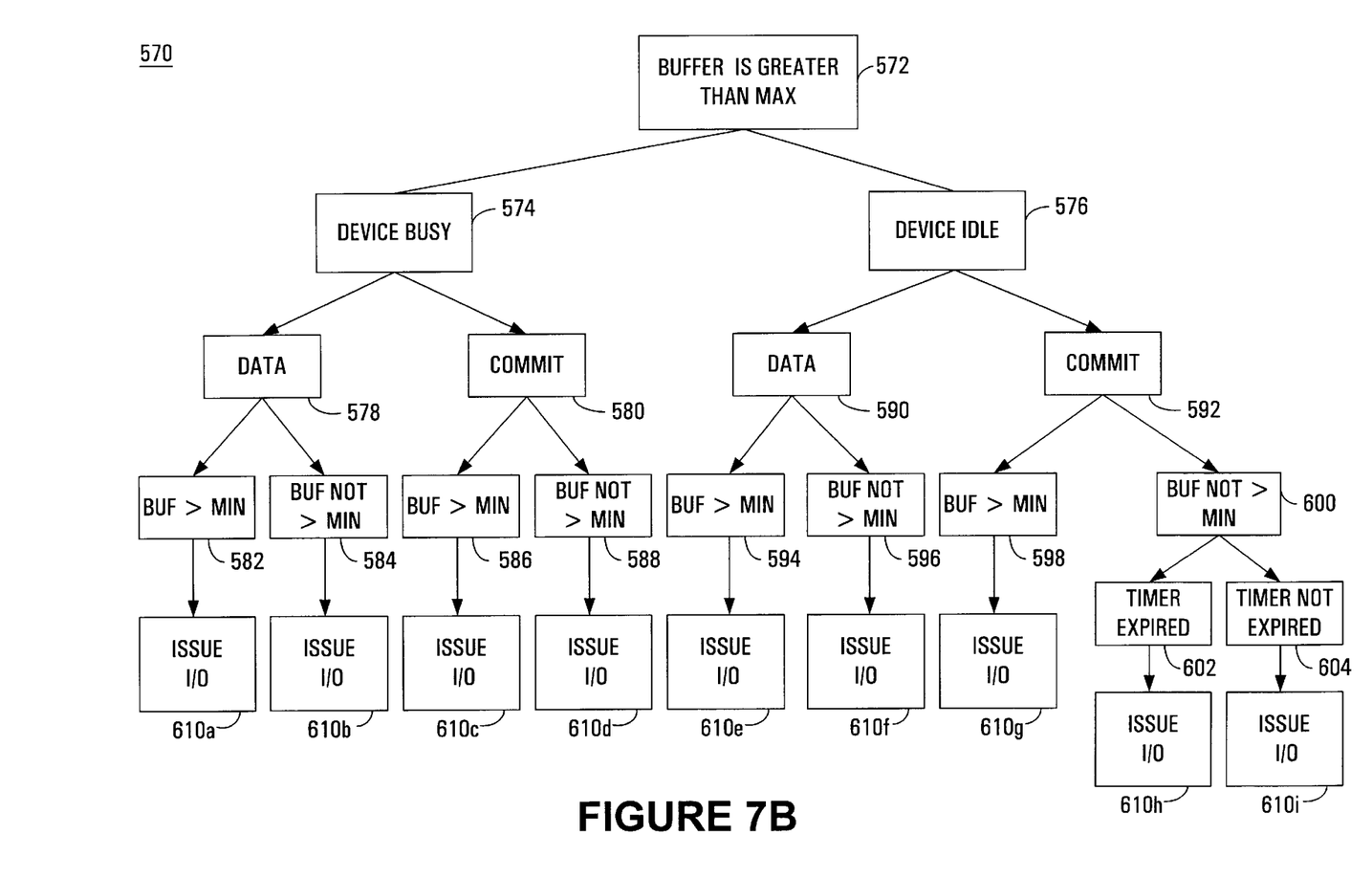

FIG. 6, FIG. 7A and FIG. 7B illustrate a decision tree 500 based on the flow diagram of FIG. 5. FIG. 6 illustrates the root 510 of the tree 500. If the contents of memory buffer 102a do not exceed the max threshold, then the tree portion 520 shown in FIG. 7A is used. If the contents of memory buffer 102a do exceed the max threshold, then the tree portion 570 shown in FIG. 7B is used. With reference to FIG. 7A, portion 520 is shown. Device busy branch 524 represents the AIJ device 104 busy while device idle branch 538 represents the AIJ device idle. It is appreciated that all bottom leaf conditions 556a–556d of the device busy branch 524 represent no I/O operation since the AIJ device workload is busy.

Data branch 540 represents the condition when the received information record is a data record while commit branch 542 represents the condition when the received information record is a commit record. It is appreciated that all bottom leaf conditions 556e–556f of the data branch 540 represent no I/O operation since data dependent server processes are not being delayed based on the received data record. Branch 548 represents the condition where the memory buffer 102a contents exceed the min threshold and the received information record is a commit record. In this case, the group commit size is determined and an I/O operation is issued as shown by leaf condition 556g. Branch 550 represents the condition where the memory buffer 102a contents do not exceed the min threshold and the received information record is a commit record. In this case, an I/O is not issued unless the watch dog timer expired (condition 552) as shown by leaf conditions 556h and 556i. Of all leaf conditions 556a–556i, only two conditions lead to an I/O being issued (556g and 556h).

With reference to FIG. 7B, portion 570 is shown. Device busy branch 574 represents the AIJ device 104 busy while device idle branch 576 represents the AIJ device idle. In either case, since the memory buffer 102a is full, all leaf conditions 610a–610i of FIG. 7B represent an I/O issuance to maintain AIJ throughput.

As shown above, the present invention provides a mechanism and method for determining group commit size based on the volume and character of information send to the AIJ file (and stored in the memory buffer 102a) and the device workload of the AIJ device 104. Unlike the fixed timer approaches of the prior art, the present invention provides a system that dynamically adapts to the changing workload conditions of the database between high throughput conditions and low throughput conditions to provide an optimum AIJ group commit process. Two main objectives of the present invention are to increase transaction throughput by allowing groups of records to be written to the AIJ file at a time while minimizing the delay faced by data dependent server processes that require transaction data to complete. These objectives are met in part by generally accumulating data records for group I/O operations while generally completing a group commit size upon the receipt of a commit record.

It is appreciated that a component of the workload group commit procedure of the present invention is programmed to issue a next I/O operation to the disk drive 104 based on the completion of a previous asynchronous I/O operation and not solely based on a fixed time interval. Among other advantages, this aspect of the present invention allows the present invention to adapt to its operating environment and throughput demands. The present invention is able to automatically adapt to increased transaction volume or to increased I/O throughput (e.g., by addition of a faster AIJ device 104). This aspects makes the present invention particularly useful within an RDBMS system.

The preferred embodiment of the present invention, a computer controlled system and method for performing workload based group committing of transaction records into an AIJ file of a durable recorded media, is thus described. While the present invention has been described in particular embodiments, it should be appreciated that the present invention should not be construed as limited by such embodiments, but rather construed according to the below claims.

What is claimed is:

1. In a database system having a processor coupled to a bus, computer readable memory unit coupled to said bus, and a nonvolatile storage device coupled to said bus, a method of storing information to said nonvolatile storage device comprising the computer implemented steps of:

(a) receiving a plurality of information records from a plurality of processes and storing said plurality of information records into a memory buffer;

(b) determining a current workload of said nonvolatile storage device; and (c) based on the character and volume of said information records stored in said memory buffer and further based on said current workload of said nonvolatile storage device, making information records durable by writing said information records stored within said memory buffer to an after image journal file of said nonvolatile storage device in an input/output operation wherein said information records written to said nonvolatile storage device by said input/output operation represent a group commit size that is dynamic in size from input/output operation to input/output operation.

2. A method as described in claim 1 wherein said information records comprise data records and commit records and wherein said step (a) comprises the step of receiving data records and commit records.

3. A method as described in claim 2 wherein said step (b) comprises the step of determining whether said nonvolatile storage device is currently idle or busy performing an input/output operation.

4. A method as described in claim 3 wherein upon receiving a received information record into said memory buffer, said step (c) comprises the steps of:

c1) determining if contents of said memory buffer exceed a predetermined maximum size threshold and, if so, writing said contents of said memory buffer to said after image journal file by issuing said input/output operation to said nonvolatile storage device;

c2) provided said nonvolatile storage device is idle and provided further said received information record is a commit record, writing said contents of said memory buffer to said after image journal file by issuing an input/output operation to said nonvolatile storage device; and c3) provided said nonvolatile storage device is idle and provided further said received information record is a data record, accumulating said data record in said memory buffer.

5. A method as described in claim 4 wherein said step c2) comprises the steps of:

writing said contents of said memory buffer to said after image journal file provided said contents of said memory buffer exceed a predetermined minimum size threshold; and writing said contents of said memory buffer to said after image journal file provided said contents of said memory buffer do not exceed a predetermined minimum size threshold but provided a watch dog timer has expired.

6. A method as described in claim 5 further comprising the step of resetting said watch dog timer upon each input/output operation that is issued to said nonvolatile storage device that writes to said after image journal file.

7. A method as described in claim 1 wherein said nonvolatile storage device is a magnetic disk drive storage device.

8. A method as described in claim 1 wherein said nonvolatile storage device is an optical nonvolatile storage device.

9. A computer system having a processor coupled to a bus, a memory coupled to said bus, and a nonvolatile storage device coupled to said bus, wherein said memory contains instructions that when executed implement a method of storing information to said nonvolatile storage device, said method comprising the computer implemented steps of:
   (a) receiving a received information record, said received information record being a data or a commit record and storing said received information record in said memory along with other previously stored information records;
   (b) determining if a current workload of said nonvolatile storage device is busy or idle; and
   (c) based on the character and volume of said information records stored in said memory and based on said current workload of said nonvolatile storage device, making information records durable by writing said information records stored within said memory to an after image journal file of said nonvolatile storage device in an input/output operation wherein said information records written to said after image journal file by said input/output operation represent a group commit size that is dynamic in size, said step (c) comprising the steps of:
      c1) determining if contents of said memory exceed a predetermined maximum size threshold and, if so, writing said contents of said memory to said after image journal file by issuing said input/output operation to said nonvolatile storage device;
      c2) provided said nonvolatile storage device is idle and provided further said received information record is a commit record, writing said contents of said memory to said after image journal file by issuing an input/output operation to said nonvolatile storage device; and
      c3) provided said nonvolatile storage device is idle and provided further said received information record is a data record, accumulating said data record in said memory.

10. A computer system as described in claim 9 wherein said step c2) comprises the steps of:
   writing said contents of said memory to said after image journal file provided said contents of said memory exceed a predetermined minimum size threshold; and
   writing said contents of said memory to said after image journal file provided said contents of said memory do not exceed a predetermined minimum size threshold but a watch dog timer has expired.

11. A computer system as described in claim 10 wherein said method further comprises the step of resetting said watch dog timer upon each input/output operation that is issued to said nonvolatile storage device that writes to said after image journal file.

12. A computer system as described in claim 9 wherein said nonvolatile storage device is a magnetic disk drive storage device.

13. A computer system as described in claim 9 wherein said nonvolatile storage device is an optical nonvolatile storage device.

14. In a computer system having a processor coupled to a bus and a nonvolatile storage device coupled to said bus, a computer readable memory unit coupled to said bus and containing program instructions stored therein that, when executed, cause said processor to implement a method of storing information to said nonvolatile storage device, said method comprising the computer implemented steps of:
   (a) receiving a received information record, said received information record being a data or a commit record and storing said received information record in a memory buffer along with other previously stored information records;
   (b) determining a current workload of said nonvolatile storage device; and
   (c) based on the character and volume of said information records stored in said memory buffer and based on said current workload of said nonvolatile storage device, making information records durable by writing said information records stored within said memory to an after image journal file of said nonvolatile storage device in an input/output operation wherein said information records written to said after image journal file by said input/output operation represent a group commit size that is dynamic in size from input/output operation to input/output operation.

15. A computer readable memory as described in claim 14 wherein said step (b) of said method comprises the step of determining whether said nonvolatile storage device is currently idle or busy performing an input/output operation.

16. A computer readable memory as described in claim 15 wherein upon receiving said received information record into said memory buffer, said step (c) of said method comprises the steps of:
   c1) determining if contents of said memory buffer exceed a predetermined maximum size threshold and, if so, writing said contents of said memory buffer to said after image journal file by issuing said input/output operation to said nonvolatile storage device;
   c2) provided said nonvolatile storage device is idle and provided further said received information record is a commit record, writing said contents of said memory buffer to said after image journal file by issuing an input/output operation to said nonvolatile storage device; and
   c3) provided said nonvolatile storage device is idle and provided further said received information record is a data record, accumulating said data record in said memory buffer.

17. A computer readable memory as described in claim 16 wherein said step c2) of said method comprises the steps of:
   writing said contents of said memory buffer to said after image journal file provided said contents of said memory buffer exceed a predetermined minimum size threshold; and
   writing said contents of said memory buffer to said after image journal file provided said contents of said memory buffer do not exceed a predetermined minimum size threshold but a watch dog timer has expired.

18. A computer readable memory as described in claim 17 wherein said method comprises the further step of resetting said watch dog timer upon each input/output operation that is issued to said nonvolatile storage device that writes to said after image journal file.

19. A computer readable memory as described in claim 14 wherein said nonvolatile storage device is a magnetic disk drive.

* * * * *